(12) United States Patent
Miller et al.

(10) Patent No.: US 8,015,427 B2
(45) Date of Patent: Sep. 6, 2011

(54) SYSTEM AND METHOD FOR PRIORITIZATION OF CLOCK RATES IN A MULTI-CORE PROCESSOR

(75) Inventors: Steven C. Miller, Sunnyvale, CA (US); Naresh Patel, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 681 days.

(21) Appl. No.: 11/738,841

(22) Filed: Apr. 23, 2007

(65) Prior Publication Data
US 2008/0263384 A1 Oct. 23, 2008

(51) Int. Cl.
*G06F 5/06* (2006.01)
*G06F 1/00* (2006.01)
*G06F 9/30* (2006.01)

(52) U.S. Cl. .......... 713/600; 713/500; 712/205
(58) Field of Classification Search .......... 713/600
See application file for complete search history.

(56) References Cited

U.S. PATENT DOCUMENTS

| | | | |
|---|---|---|---|
| 5,504,861 A | 4/1996 | Crockett et al. | |
| 5,592,618 A | 1/1997 | Micka et al. | |
| 5,657,440 A | 8/1997 | Micka et al. | |
| 5,682,513 A | 10/1997 | Candelaria et al. | |
| 5,815,693 A * | 9/1998 | McDermott et al. | 713/501 |
| 6,144,999 A | 11/2000 | Khalidi et al. | |
| 6,502,205 B1 | 12/2002 | Yanai et al. | |
| 6,711,693 B1 | 3/2004 | Golden et al. | |
| 6,983,353 B2 | 1/2006 | Tamer et al. | |
| 6,985,499 B2 | 1/2006 | Elliot | |
| 7,024,584 B2 | 4/2006 | Boyd et al. | |
| 7,152,077 B2 | 12/2006 | Veitch et al. | |
| 7,203,732 B2 | 4/2007 | McCabe et al. | |
| 7,269,713 B2 * | 9/2007 | Anderson et al. | 712/214 |
| 7,278,049 B2 | 10/2007 | Bartfai et al. | |
| 7,343,460 B2 | 3/2008 | Poston | |
| 7,380,081 B2 | 5/2008 | Ji et al. | |
| 7,418,368 B2 * | 8/2008 | Kim et al. | 702/185 |

(Continued)

FOREIGN PATENT DOCUMENTS
EP 1617330 A2 1/2006

OTHER PUBLICATIONS

PCT Notification of Transmittal of the International Search Report and the Written Opinion of the International Searching Authority, or the Declaration, International Application No. PCT/US2008/004766, International Filing Date: Apr. 14, 2008, Date of Mailing of Document: May 12, 2009, 17 pages.

(Continued)

*Primary Examiner* — Suresh K Suryawanshi
(74) *Attorney, Agent, or Firm* — Cesari and McKenna, LLP

(57) ABSTRACT

A system and method for prioritization of clock rates in a multi-core processor is provided. Instruction arrival rates are measured during a time interval $T_{i-1}$ to $T_i$ by a monitoring module either internal to the processor or operatively interconnected with the processor. Using the measured instruction arrival rates, the monitoring module calculates an optimal instruction arrival rate for each core of the processor. For processors that support continuous frequency changes for cores, each core is then set to an optimal service rate. For processors that only support a discrete set of arrival rates, the optimal rates are mapped to a closest supported rate and the cores are set to the closest supported rate. This procedure is then repeated for each time interval.

21 Claims, 3 Drawing Sheets

U.S. PATENT DOCUMENTS

| | | |
|---|---|---|
| 7,467,168 B2 | 12/2008 | Kern et al. |
| 7,467,265 B1 | 12/2008 | Tawri et al. |
| 7,475,207 B2 | 1/2009 | Bromling et al. |
| 7,539,976 B1 | 5/2009 | Ousterhout et al. |
| 7,571,268 B2 | 8/2009 | Kern et al. |
| 7,624,109 B2 | 11/2009 | Testardi |
| 7,720,801 B2 | 5/2010 | Chen |
| 2003/0204759 A1 | 10/2003 | Singh |
| 2005/0050115 A1 | 3/2005 | Kekre |
| 2005/0154786 A1 | 7/2005 | Shackelford |
| 2006/0006918 A1 | 1/2006 | Saint-Laurent |
| 2006/0015507 A1 | 1/2006 | Butterworth et al. |
| 2007/0165549 A1 | 7/2007 | Surek et al. |
| 2008/0162594 A1 | 7/2008 | Poston |
| 2008/0243951 A1 | 10/2008 | Webman et al. |
| 2008/0243952 A1 | 10/2008 | Webman et al. |
| 2008/0288646 A1 | 11/2008 | Hasha et al. |

OTHER PUBLICATIONS

Isci, Canturk, et al., "An Analysis of Efficient Multi-Core Global Power Management Policies: Maximizing Performance for a Given Power Budget", the 39$^{th}$ Annual IEEE/ACM International Symposium on Microarchitecture (MICRO '06), Dec. 1, 2006, 12 pages.

Oklobdzija, Vojin G., "The Computer Engineering Handbook", CRC Press, 2002, ISBN: 0849308852, 9780849308857, pp. 8-23-8-25.

Mills, David L., "Network Time Protocol (version 3) Specification, Implementation and Analysis," Network Working Group, XP002935527, Mar. 1, 1992, pp. i-vii and 1-113.

Network Appliance, Inc., "Notification of Transmittal of the International Search Report and the Written Opinion of the International Searching Authority, or the Declaration," International Filing Date: Mar. 19, 2008, International Application No. PCT/US2008/003554, Date of Mailing: Aug. 26, 2008, pp. 1-14.

Network Appliance, Inc., "Notification of Transmittal of the International Search Report and the Written Opinion of the International Searching Authority, or the Declaration," International Filing Date: Mar. 19, 2008, International Application No. PCT/US2008/003612, Date of Mailing: Nov. 5, 2008, pp. 1-17.

Network Appliance, Inc., "Notification of Transmittal of the International Search Report and the Written Opinion of the International Searching Authority, or the Declaration," International Filing Date: Mar. 20, 2008, International Application No. PCT/US2008/003692, Date of Mailing: Nov. 5, 2008, pp. 1-17.

\* cited by examiner

SYSTEM AND METHOD FOR PRIORITIZATION OF CLOCK RATES IN A MULTI-CORE PROCESSOR

FIELD OF THE INVENTION

The present invention relates to multi-core processors and, more particularly, to prioritization of clock rates in multi-core processors to achieve improved instruction throughput.

BACKGROUND OF THE INVENTION

Over the past number of years continual improvement of microprocessor performance has been achieved through continued increases in clock rates associated with microprocessors. However, recently the improvement has slowed to a fraction of what has occurred in the past. Modern microprocessor designers are now achieving additional performance by increasing the number of microprocessor cores placed on a single semiconductor die. These multi-core processors enable a plurality of operations to be performed in parallel, thereby increasing instruction throughput, i.e., the total number of instructions executed per unit of time.

A noted disadvantage of multi-core processors is that with the addition of each core, the total power consumed by the processor increases. This results in generation of additional heat that must be dissipated, etc. Modern processors have a power envelope associated therewith based on the physical limitations of heat dissipation, etc. of the physical processors and packaging of the processors. Running a processor over the power envelope may cause physical damage to the processor and/or the cores contained therein.

Certain processors, such as those designed for laptop computers, include active power management to lower the total power consumed, in turn, by lowering the operational frequency of the processors. This may occur when, e.g., a laptop is placed in a standby mode. Processors designed for servers or other non-laptop applications typically have not been concerned about operating on battery power; however, the total power consumed (or heat generated) is now reaching a point where allowing power consumption to increase is no longer feasible due to physical constraints of the processor and/or processor packaging.

Generally, in a multi-core system, running all cores at full speed results in a power consumption of $nP_{max}$ watts, where n is the number of cores in the processor and $P_{max}$ is the maximum power consumed by a single core. However, the processor's power budget is such that only $\alpha P_{max}$ watts is feasible, where $\alpha$ represents a fraction of total power that may be consumed due to physical limitations of the semiconductor die and/or packaging.

Typically, processor cores operate using a fixed allocation of power consumption among the cores. However, a noted disadvantage of such a fixed allocation technique is that the overall system throughput, as measured by instructions performed per unit time, is suboptimal as will be shown herein. Assume that the frequency of each of the cores may be varied on some multiple of the clock cycle to a spectrum of frequencies ($f_0, f_1, \ldots, f_{max}$). The power dissipation of the core is proportional to the square of the chosen frequency. As will be appreciated by one skilled in the art, the selected clock rate for a core during a particular time interval determines the core's instruction rate during that time interval.

Without loss of generality, assume that each core is capable of operating at one billion instructions per second (1 BIPS). Let the vector $s=\{s_i, 0<i\leq n, 0\leq s_i\}$ be the set of instruction service rates for each core. Furthermore, let the power for these n cores be defined as follows:

$$P(s) = \sum_{i=1}^{n} c_i s_i^2 \leq \alpha n P_{max} \qquad (1)$$

where $c_i$ is a constant for core i. The constant $c_i$ may represent architectural differences for a particular core. For example, one core on a processor may comprise a floating point unit which consumes more power per instruction, than, e.g. a simple arithmetic unit. As such, the power cost $c_i$ of that core may vary from other cores of the processor. To simplify modeling, assume that power varies with the square of the frequency and that the frequency determines the maximum instruction rate.

To maintain overall operations within the power envelope of $\alpha n P_{max}$ a processor designer could evenly distribute the processing capability across all cores. For simplicity, assuming $c_i=1$, then Equation (1) becomes:

$$\alpha n P_{max} = \sum_{i=1}^{n} c_i s_i^2 = n s_i^2$$

which reduces to:

$$s_i^2 = \alpha P_{max}$$

Thus, if all cores utilize a fixed allocation, then all cores can be allocated a service rate that is $s_i = \sqrt{\alpha P_{max}}$. To simplify this further for comparison purposes let $P_{max}=1$, so:

$$s_i = \sqrt{\alpha} \qquad (2)$$

This indicates that under the fixed allocation scheme when power is reduced by $1-\alpha$, the core service rates are reduced by $1-\sqrt{\alpha}$.

Let the vector $a=\{a_i, 0<i\leq n, 0\leq a_i\}$ represent a set of requested instruction annual rates for each core by an applied workload during a given interval. A noted disadvantage is that the requested instruction annual rates may vary considerably and may exceed the fixed service rates during certain time intervals. Thus, the system throughput is suboptimal.

SUMMARY OF THE INVENTION

The present invention overcomes the disadvantages of the prior art to providing a system and method for prioritization of clock rates in a multi-core processor. Instruction arrival rates are measured during a time interval $T_{i-1}$ to $T_i$ by a monitoring module either internal to the processor or operatively interconnected with the processor. Using the measured instruction arrival rates, the monitoring module calculates an optimal instruction arrival rate for each core of the processor. For processors that support continuous frequency changes for cores, each core is then set to an optimal service rate. For processors that only support a discrete set of arrival rates, the optimal rates are mapped to a closest supported rate and the cores are set to the closest supported rate. This procedure is then repeated for each time interval. By setting time intervals at an appropriate level, e.g., 1 millisecond, the present invention may approximate optimal instruction rate allocations among the cores, thereby improving system throughput.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for prioritization of clock rates in a multi-core processor. Illustratively, instruction arrival rates are measured during a time interval $T_{i-1}$ to $T_i$ by a monitoring module associated with the processor. Using the measured instruction arrival rates, the monitoring module calculates an optimal instruction arrival rate for each core of the processor. This optimal instruction arrival rate is then used to dynamically modify the allocation of arrival rates among the cores, thereby increasing overall instruction throughput.

A. Multi-Core System Architecture

Figure 1:
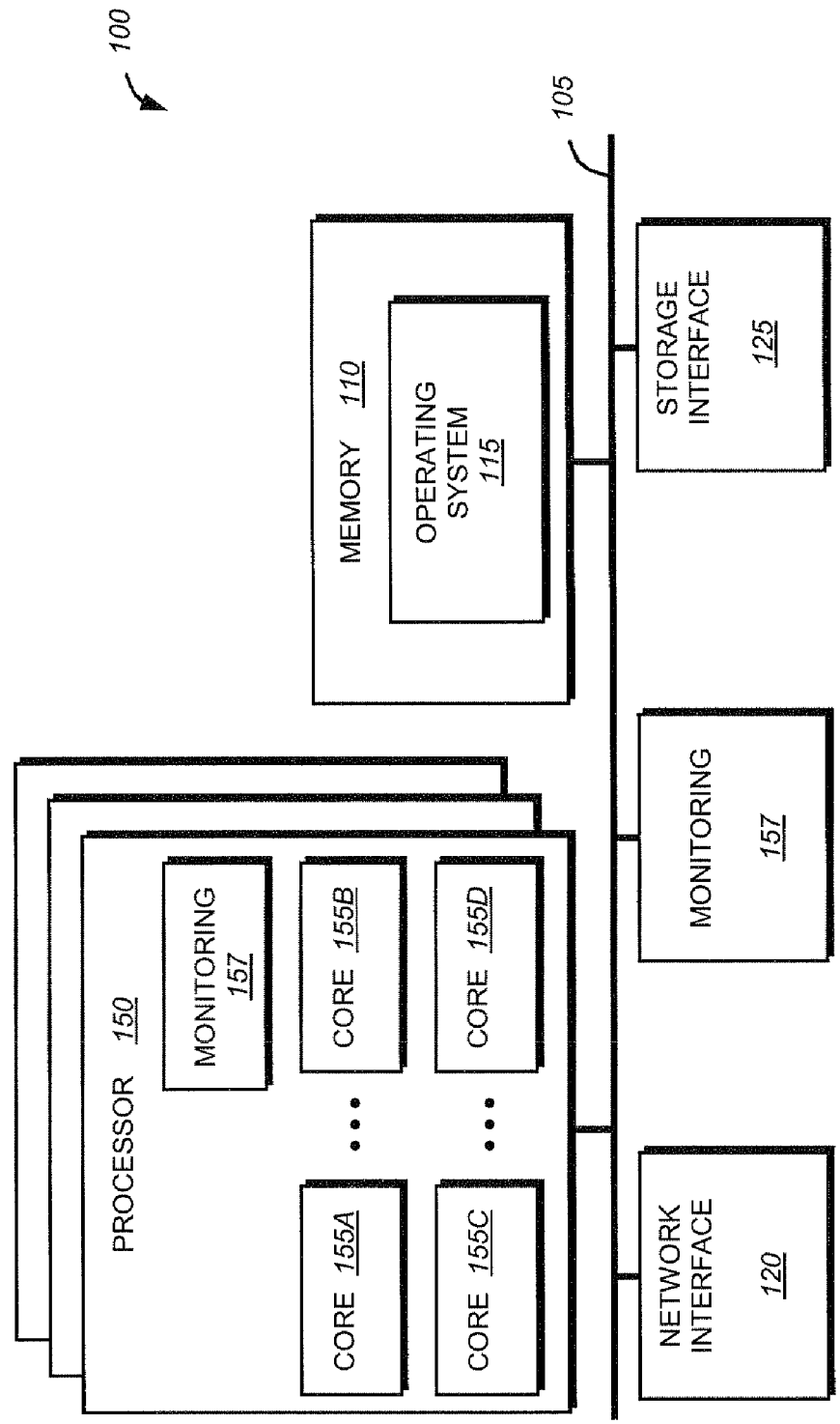
FIG. 1 is a schematic block diagram of an exemplary computer system having a multi-core processor in accordance with an illustrative embodiment of the present invention.

FIG. 1 is a schematic block diagram of an exemplary computer system environment 100 including a multi-core processor 150 in accordance with an illustrative embodiment of the present invention. The computer system 100 illustratively includes a memory 110, a network interface 120, a storage interface 125, a monitoring module 157 and one or more multi-core processors 150 interconnected by a system bus 105. The memory 110 illustratively includes an operating system 115 that configures the computer 100 for basic services. It should be noted that while memory 110 is shown interconnected with the system bus 105, in alternative embodiments, the memory 110 may be directly attached to the processors 150 and/or other components. As such, the description of memory 110 being connected to system bus 105 should be taken as exemplary only. Illustratively, the operating system 115 may comprise a multi-threaded operating system that is configured to execute various threads on the plurality of cores 155. Additionally, the memory 110 may include one or more applications (not shown) executing in conjunction with the operating system 115.

The network interface 120 comprises mechanical, electrical and signaling circuitry needed to connect the system to other systems over a network. The storage interface 125 coordinates with the operating system executing on the system to store and retrieve information requested on any type of attached array of writable storage device media such as video tape, optical, DVD, magnetic tape, bubble memory, electronic random access memory, micro-electromechanical and any other similar media adapted to store information, including data and/or parity information.

The multi-core processor 150 illustratively includes a plurality of cores 155 A-D. It should be noted that any number of cores may be utilized in a single processor and any number of processors may be utilized in a single computer 100. As such, the description of four cores 155A-D in a single processor 150 should be taken as exemplary only. In accordance with an illustrative embodiment of the present invention, a monitoring module 157 is included within processor 150. The monitoring module 157, which may be included within processor 150 or may be external to the processor, such as a monitoring module 157 interconnected to the system bus 105, monitors instruction arrival rates for each core 155 in accordance with an illustrative embodiment of the present invention. That is, the monitoring module 157 may identify the total number of instructions executed by a processor core 155 during a predefined quantum of time.

Furthermore, the monitoring module 157 may modify service rates for each of the cores to optimize instruction rate throughput in accordance with an illustrative embodiment of the present invention, as described further below. Illustratively, the monitoring module may comprise necessary external circuitry to monitor instruction arrival rates to each of the cores of the processor and to modify the service rates of each core in accordance with an illustrative embodiment of the present invention. The monitoring module may utilize various features of the processor in obtaining and/or setting instruction arrival rates, e.g., the processor may include functionality to enable external monitoring of instruction arrival rates. Alternatively, many cores include functionality to count retired instructions during a predefined time period. In processors using such cores, the functionality of the monitoring module may be implemented directly into each core. As such, the description of the monitoring module comprising a separate module internal or external to the processor should be taken as exemplary only. In illustrative embodiments, the functionality of the monitoring module may be directly integrated into the cores of a processor. As such, the description of a separate monitoring module should be taken as exemplary only.

B. Optimizing Core Frequencies

The present invention provides a system and method for prioritization of clock rates in a multi-core processor. Instruction arrival rates are measured during a time interval $T_{i-1}$ to $T_i$ by a monitoring module, either internal to the processor or operatively interconnected with the processor. Using the measured instruction arrival rates, the monitoring module calculates an optimal instruction arrival rate for each core of the processor. For processors that support continuous frequency changes for cores, each core is then set to an optimal service rate. For processors that only support a discrete set of arrival rates, the optimal rates are mapped to a closest supported rate and the cores are set to the closest supported rate. This procedure is then repeated for each time interval. By setting time intervals at an appropriate level, e.g., 1 millisecond, the present invention may approximate optimal instruction rate allocations among the cores, thereby improving system throughput.

More generally, the present invention provides a technique for optimizing frequency allocations among cores of a multi-core processor. As used herein, n is the number of cores on a single processor. Similarly, a represents a vector of requested instruction annual rates, while α represents the fraction of maximum power that is within the appropriate power budget for the processor. Note that the value of α may vary depending upon, e.g., environmental concerns, architectural designs of a processor, etc. According to an illustrative embodiment of the present invention, the monitoring module determines a vector s of instruction service rates that are utilized to achieve increased instruction throughput among all of the cores of a processor.

The utilization of the cores is given by the vector u=a/s wherein each element is less than or equal to one. That is, the utilization of the cores (u) equals the instruction arrival rate divided by the optimal instruction service rate among each of the cores. As noted above, the clock rate (frequency) for a given core during a time interval determines the core's instruction rate during that time interval. The present invention is directed to a technique to maximize the utilization of the cores subject to the power constraint in Equation (1). More generally, the present invention utilizes an estimated instruction rate to set the clock rate for a next time interval. To that end, an illustrative objective function H is given by:

$$H = \sum_{i=1}^{n} \frac{a_i}{s_i} + y\left(\sum_{i=1}^{n} c_i s_i^2 - \alpha n P_{max}\right)$$

wherein y is a LaGrange multiplier.
Differentiating this with respect to $s_k$ for k=1, 2, ..., n results in:

$$\frac{\partial H}{\partial s_k} = -\frac{a_k}{s_k^2} + y(2c_k s_k)$$

Setting this to zero and re-arranging results in:

$$s_k^2 = \left(\frac{a_k}{2c_k y}\right)^{2/3} \quad (3)$$

Summing this over all k=1, 2, ..., n and using Equation (1) generates:

$$\alpha n P_{max} = \sum_{k=1}^{n} c_k s_k^2 = \sum_{k=1}^{n} c_k \left(\frac{a_k}{2c_k y}\right)^{2/3} \quad (4)$$

Thus, $$\left(\frac{1}{y}\right)^{2/3} = \alpha n P_{max} \bigg/ \left(\sum_{k=1}^{n} c_k \left(\frac{a_k}{2c_k}\right)^{2/3}\right)$$

Substituting this back into Equation (3) results in:

$$s_k^2 = \left(\frac{a_k}{c_k}\right)^{2/3} \alpha n P_{max} \bigg/ \left(\sum_{k=1}^{n} c_k \left(\frac{a_k}{c_k}\right)^{2/3}\right) \quad (5)$$

Assuming that $c_k=1$, i.e., each core is equivalent to each other core on a single processor, the interpretation is that for optimal allocation the square of the instruction service rates should be assigned by apportioning a fraction $$a_k^{2/3} \bigg/ \left(\sum_{k=1}^{n} a_k^{2/3}\right)$$

of the power budget to core k.

This gives the optimal service rates for the cores of a set to maximize the throughput subject to the power constraint. However, it assumes the instruction arrival rate for each core is known. In practice, the arrival rates of the cores are not known a priori, but arrival rates can be estimated from past history. For example, by measuring the arrival rates in the interval $T_{i-1}$ to $T_i$ using, e.g., monitoring module 157, it is possible to predict the arrival rates in time period $T_i$ to $T_{i+1}$. Typically, arrival rates are correlated among subsequent time periods if the interval is made small enough, e.g., approximately one millisecond. Assuming that the overhead of changing core speeds in a processor is small enough, the monitoring module may effectuate changes thousands of times a second (e.g., as part of a clock interrupt) to enable updates to power allocations among the cores of a processor. In practice, chip vendors will likely implement a discrete set of frequencies rather than a continuous spectrum that Equation (5) suggests. Optimal service rates (frequency) may be computed and then mapped to the nearest discrete frequency that is supported.

Figure 2:
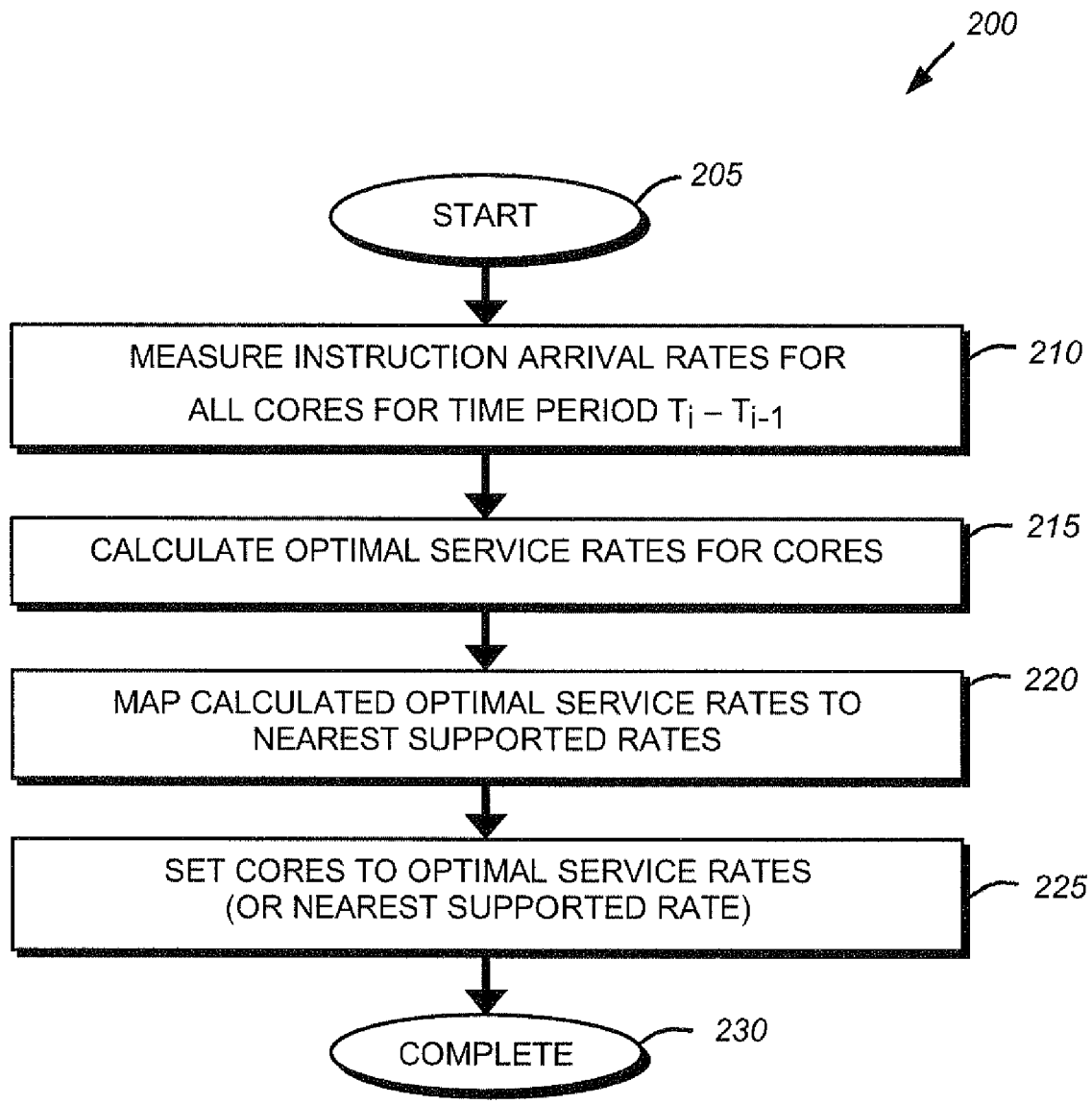
FIG. 2 is a flow chart detailing the steps of a procedure for prioritization of clock rates in a multi-core processor in accordance with an illustrative embodiment of the present invention.

FIG. 2 is a flow chart detailing the steps of an exemplary procedure 200 for prioritization of clock rates in a multi-core processor in accordance with an illustrative embodiment of the present invention. The procedure 200 begins in step 205 and continues to step 210 where the system measures instruction arrival rates for all cores 155 for time period $T_{i-1}$ to $T_i$. The measurement of instruction arrival rates may be performed using a variety of techniques, including, for example, appropriate functionality in the processor 150 to measure an instruction arrival rate at each core, such as a monitoring module 157 as a port of processor 150. In alternate embodiments, an external monitoring module 157 may be utilized to monitor instruction arrival rates to the cores of the processor.

Utilizing the measured instruction arrival rates, the monitoring module 157 then, in step 215, calculates the optimal service rates for the cores. Illustratively, this is accomplished by assigning $$a_k^{2/3} \bigg/ \left(\sum_{k=1}^{n} a_k^{2/3}\right)$$

of the overall power to each core based on the measured arrival rate $a_k$ of each core. As typically chip manufacturers may not enable continuous frequency ranges among the cores, the monitoring module maps the calculated optimal service rates to the nearest supported rates for the cores in step 220. Thus, for example, if the optimally calculated service rate is 1.2 billion instructions per second (BIPs) for a particular core, and the core only supports 1 BIPs or 1.5 BIPs, the monitoring module will map the particular core to 1 BIPs.

Then, in step 225, the monitoring module sets the cores to the optimal service rates (or the nearest supported rates). Thus, during the next time interval ($T_i$ to $T_{i+1}$) the various processor cores execute at the optimal instruction arrival rates (or the nearest supported rates) which enable improved overall processor performance while maintaining power consumption within the power envelope. By utilizing the principles of the present invention overall processor throughput is increased while maintaining power consumption below the power envelope for a particular processor. The procedure then completes in step 230. As will be appreciated by one skilled in the art, procedure 200 is continuously repeated by the monitoring module and/or processor so that during each time period, e.g., every millisecond, each core is operating at the optimal service rate.

Figure 3:
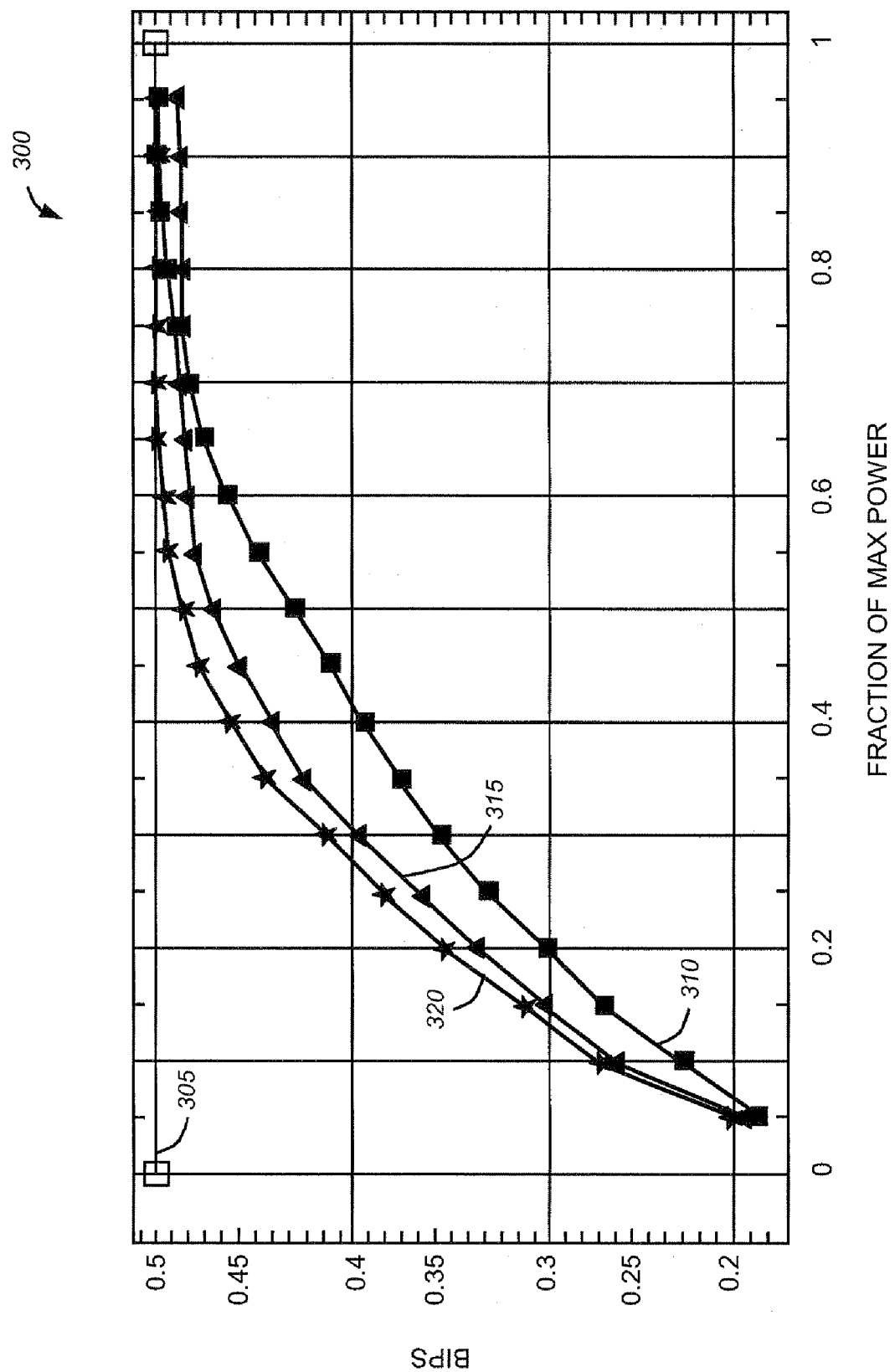
FIG. 3 is a chart detailing observed instructions per second versus fraction of maximum power in accordance with an illustrative embodiment of the present invention.

FIG. 3 is a chart detailing observed instructions per second versus fraction of maximum power in accordance with an illustrative embodiment of the present invention. Here, the X-axis comprises differing values of α, i.e., fractions of the maximum power available, while the Y-axis represents throughput in billion instructions per second (BIPS). Line 305 shows the requested arrival rate under no power constraints. Line 310, which is delineated with filled in squares, illustrates a curve for a prior art fixed allocation technique. As can be seen from graph 300, utilizing a fixed allocation results in the lowest overall throughput of instructions executed by the processor. Line 315, delineated by triangles, illustrates a graph of dynamic allocation in accordance with the principles of the present invention, whereas line 320, delineated by stars, illustrates the ideal allocation curve based on perfect knowledge of incoming arrival rates. As can be appreciated from graph 300, the dynamic allocation scheme of the present invention shows over a 13% increase in throughput at certain fractions of maximum power as compared to the fixed allocation technique. It should be noted that as improvements to materials increase, thereby increasing the maximum power able to dissipated by a processor, the principles of the present invention may be utilized to improve throughput over varying ranges of $\alpha$.

In accordance with alternative embodiments of the present invention, the monitoring module 157 may collect historical information regarding instruction arrival rates when certain types of processes are executing on processor 150. For example, the monitoring module 157 may collect such historical data for analysis of various instruction arrival rates based on types of processes executing. In such alternative embodiments, when a process is initialized via, e.g., a task switch from another type of process, the monitoring module 157 may preconfigure the processor 150 using historical arrival rates associated with the type of process to be executed. This preconfiguration may improve initial throughput during task switching until appropriate samples may be taken once the task switch has been effectuated.

The foregoing description has been directed to specific embodiments of this invention. It will be apparent, however, that other variations and modifications may be made to the described embodiments, but the attainment of some or all of their advantages. For instance, it is expressly contemplated that the teachings of this invention can be implemented as software, including a computer-readable medium having program instructions executing on a computer, hardware, firmware, or a combination thereof. Accordingly, this description is to be taken by way of example of and not to otherwise limit the scope of the invention. Therefore, it is the object of the appended claims to cover all such variations and modifications as come within the true spirit and scope of the invention.

What is claimed is:

1. A method for adjusting power consumed by a multi-core processor comprising:
   measuring an instruction arrival rate for each of a plurality of cores of the multi-core processor for a time period, the instruction arrival rate determined for a particular core of the plurality of cores by measuring a number of instructions arriving at the particular core for processing by the particular core during the time period;
   assigning a maximum permissible power usage by the processor;
   calculating an optimal instruction arrival rate for each core of the plurality of cores, the optimal instruction arrival rate for the each core selected in response to the core measured instruction arrival rate for all cores of the plurality of cores and selected to limit a total power used by the processor to be less than the maximum permissible power usage by the processor, so that a sum of power used by all cores of the plurality of cores is less than the maximum permissible power usage of the processor; and
   setting the each core of the plurality of cores to the calculated optimal instruction arrival rate for the each core for a next time period.

2. The method of claim 1, further comprising:
   measuring the core measured instruction arrival rate by the processor.

3. The method of claim 1, further comprising:
   measuring the core measured instruction arrival rate by a monitoring module external to the processor.

4. The method of claim 1, further comprising:
   setting each of the plurality of cores to a predefined rate supported by the processor that is closest to the calculated optimal instruction arrival rate.

5. The method of claim 1, further comprising:
   setting the optimal instruction arrival rate for each core equal to $$a_k^{2/3} \Big/ \left( \sum_{k=1}^{n} a_k^{2/3} \right),$$

wherein $a_k$ represents the core measured instruction arrival rate for core k and wherein n represents a total number of cores of the plurality of cores.

6. The method of claim 1, further comprising:
   utilizing the core measured instruction arrival rate for each of the plurality of cores for the time period in calculating the optimal instruction arrival rate for each of the plurality of cores.

7. The method of claim 1, further comprising:
   using approximately one millisecond as the time period.

8. The method of claim 1, further comprising:
   repeating the calculation for every unit of time equal to the time period.

9. The method of claim 1, further comprising:
   allocating a portion of total power available to each of the cores in proportion to the core measured instruction arrival rate.

10. A system for adjusting power consumed by a multi-core processor, comprising:
    a plurality of cores of the processor;
    means for measuring an instruction arrival rate for each of the plurality of cores for a time period, the instruction arrival rate determined for a particular core of the plurality of cores by measuring a number of instructions arriving at the particular core for processing by the particular core during the time period;
    means for assigning a maximum permissible power usage by the processor;
    means for calculating an optimal instruction arrival rate for each core of the plurality of cores, the optimal instruction arrival rate for the each core selected in response to the core measured instruction arrival rate for all cores of the plurality of cores and selected to limit a total power used by the processor to be less than the maximum permissible power usage of the processor, so that a sum of power used by all cores of the plurality of cores is less than the maximum permissible power usage of the processor; and
    means for setting the each core of the plurality of cores to the calculated optimal instruction arrival rate for a next time period.

11. The system of claim 10, further comprising:
    means for setting each of the cores to a predefined rate closest to the calculated optimal instruction arrival rate.

12. The system of claim 10, further comprising:
wherein the measuring means is external to the processor.

13. A system for adjusting power consumed by a multi-core processor, comprising:
a processor having a plurality of cores;
a maximum permissible power usage by the processor;
the processor configured to,
(i) measure an instruction arrival rate for each of the plurality of cores for a time period, the instruction arrival rate determined for a particular core of the plurality of cores by measuring a number of instructions arriving at the particular core for processing by the particular core during the time period;
(ii) calculate an optimal instruction arrival rate for each core of the plurality of cores, the optimal instruction arrival rate for the each core selected in response to the core measured instruction arrival rate for all cores of the plurality of cores and selected to limit a total power used by the processor to be less than the maximum permissible power usage of the processor, so that a sum of power used by all cores of the plurality of cores is less than the maximum permissible power usage of the processor; and
(iii) set the each core of the plurality of cores to the calculated optimal instruction arrival rate for the each core for a next time period.

14. The system of claim 13, further comprising:
the optimal instruction arrival rate for each of the plurality of cores is set to $$a_k^{2/3} \Big/ \left( \sum_{k=1}^{n} a_k^{2/3} \right),$$

wherein $a_k$ represents the measured instruction arrival rate for core k and wherein n represents a total number of cores of the plurality of cores. *

15. The system of claim 13, further comprising:
the processor is further configured to set each of the plurality of cores to the calculated optimal service rate by setting each of the cores to an available service rate closest to the calculated optimal service rate.

16. The system of claim 13, further comprising:
the processor is further configured to utilizes the core measured instruction arrival rate for each of the plurality of cores in calculating the optimal instruction arrival rate for each of the plurality of cores.

17. The system of claim 13, further comprising:
the processor is further configured to allocate a portion of total power available to each of the cores in proportion to the core measured instruction arrival rate.

18. A system to adjust power consumed by a multi-core processor, comprising:
a processor having a plurality of cores;
a maximum permissible power usage by the processor;
the processor configured to connect with a monitoring module, the monitoring module configured to
(i) measure an instruction arrival rate for each of the plurality of cores associated therewith for a time period, the instruction arrival rate determined for a particular core of the plurality of cores by measuring a number of instructions arriving at the particular core for processing by the particular core during the time period;
(ii) calculate an optimal instruction arrival rate for each core of the plurality of cores, the optimal instruction arrival rate for the each core selected in response to the core measured instruction arrival rate for all cores of the plurality of cores and selected to limit a total power used by the processor to be less than the maximum permissible power usage of the processor, and
(iii) set the each core of the plurality of cores to the calculated optimal instruction arrival rate for the each core for a next time period.

19. The system of claim 18, further comprising:
the optimal -instruction arrival rate for each of the plurality of cores is set to $$a_k^{2/3} \Big/ \left( \sum_{k=1}^{n} a_k^{2/3} \right),$$

wherein $a_k$ represents the core measured instruction arrival rate for core k and wherein n represents a total number of cores of the plurality of cores.

20. The system of claim 18, further comprising:
the monitoring module is further configured to set each of the plurality of cores to the calculated optimal instruction arrival rate by setting each of the cores to an available optimal instruction arrival rate closest to the calculated optimal instruction arrival rate.

21. A physical computer-readable storage media containing executable program instructions for execution by a processor, the physical computer-readable storage media comprising:
program instructions that measure an instruction arrival rate for each of a plurality of cores of a processor for a time period, the instruction arrival rate determined for a particular core of the plurality of cores by measuring a number of instructions arriving at the particular core for processing by the particular core during the time period;
program instructions that assign a maximum permissible power usage by the processor;
program instructions that calculate an optimal instruction arrival rate for each core of the plurality of cores, the optimal instruction arrival rate for the each core selected in response to the core measured instruction arrival rate for all cores of the plurality of cores and selected to limit a total power used by the processor to be less than the maximum permissible power usage of the processor, so that a sum of power used by all cores of the plurality of cores is less than the maximum permissible power usage of the processor; and
program instructions that sett the each core of the plurality of cores to the calculated optimal instruction arrival rate for the each core for a next time period.

* * * * *